(12) United States Patent
Olston (10) Patent No.: US 8,965,842 B2
(45) Date of Patent: Feb. 24, 2015

(54) VIRTUAL ENVIRONMENT SPANNING DESKTOP AND CLOUD

(71) Applicant: Yahoo! Inc., Sunnyvale, CA (US)

(72) Inventor: Christopher Olston, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/331,372

(22) Filed: Jul. 15, 2014

(65) Prior Publication Data

US 2014/0324822 A1 Oct. 30, 2014

Related U.S. Application Data

(63) Continuation of application No. 12/266,364, filed on Nov. 6, 2008, now Pat. No. 8,838,527.

(51) Int. Cl.
*G06F 17/30* (2006.01)

(52) U.S. Cl.
CPC .... *G06F 17/30442* (2013.01); *G06F 17/30864* (2013.01)
USPC ............................ 707/609; 707/610; 707/645

(58) Field of Classification Search
USPC ......................................... 707/609, 610, 645
See application file for complete search history.

(56) References Cited

U.S. PATENT DOCUMENTS

| 7,383,247 B2 * | 6/2008 | Li et al. ................................. 1/1 |
| 8,255,414 B2 * | 8/2012 | Lee et al. ...................... 707/767 |
| 2002/0129106 A1 * | 9/2002 | Gutfreund ..................... 709/205 |
| 2006/0053097 A1 * | 3/2006 | King et al. ......................... 707/3 |
| 2008/0005168 A1 * | 1/2008 | Huff et al. .................. 707/104.1 |

* cited by examiner

*Primary Examiner* — Noosha Arjomandi
(74) *Attorney, Agent, or Firm* — James J. DeCarlo; Greenberg Traurig, LLP (57) ABSTRACT

A method and system are given for providing a virtual environment spanning a desktop and a cloud. In one example, the method includes receiving a query template over a data set that resides in the cloud, optimizing the query template to segment the query template into an offline phase and an online phase, executing the offline phase on the cloud to build one or more indexes, and sending the one or more indexes to the desktop.

20 Claims, 4 Drawing Sheets

FIG. 4 form a thorough understanding of the present invention. It will be understood, however, to one skilled in the art, that the present invention may be practiced with other specific details.

VIRTUAL ENVIRONMENT SPANNING DESKTOP AND CLOUD

CROSS REFERENCE TO RELATED APPLICATIONS

This application is a continuation of and claims priority from co-pending U.S. patent application Ser. No. 12/266,364, filed Nov. 6, 2008, entitled "Virtual Environment Spanning Desktop and Cloud," which is incorporated herein by reference.

FIELD OF THE INVENTION

The present invention relates to virtual environments for database queries. More particularly, the present invention relates to virtual environments that span a desktop and a cloud and that facilitate database queries.

BACKGROUND OF THE INVENTION

Cloud computing has received significant attention lately as a means to process large data sets, yet people still prefer to manage data on their local desktop machine. While the cloud offers the ability to scale, the desktop offers numerous practical advantages such as straightforward debugging of program logic, availability of useful tools like spreadsheets, and in general offers more convenience and autonomy compared with timeshared cloud environments. Hence, a standard practice for dealing with large data sets is to process them initially in the cloud and, as soon as sufficient data reduction has occurred, to migrate the data to the desktop for exploration and analysis.

Unfortunately, there is a significant amount of labor involved in managing data and logic in both environments, staging it back and forth, dealing with bugs that arise in one environment but not the other, and dividing processing into appropriate cloud-side and desktop-side components.

SUMMARY OF THE INVENTION

What is needed is an improved method having features for addressing the problems mentioned above and new features not yet discussed. Broadly speaking, the present invention fills these needs by providing a method and system of providing a virtual environment spanning a desktop and a cloud. It should be appreciated that the present invention can be implemented in numerous ways, including as a method, a process, an apparatus, a system or a device. Inventive embodiments of the present invention are summarized below.

In one embodiment, a method is given for providing a virtual environment spanning a desktop and a cloud. The method comprises receiving a query template over a data set that resides in the cloud, optimizing the query template to segment the query template into an offline phase and an online phase, executing the offline phase on the cloud to build one or more indexes, and sending the one or more indexes to the desktop.

In another embodiment, a system is given for providing a virtual environment spanning a desktop and a cloud. The system is configured for receiving a query template over a data set that resides in the cloud, optimizing the query template to segment the query template into an offline phase and an online phase, executing the offline phase on the cloud to build one or more indexes, and sending the one or more indexes to the desktop.

In still another embodiment, a computer readable medium is provided carrying one or more instructions for providing a virtual environment spanning a desktop and a cloud. The one or more instructions, when executed by one or more processors, cause the one or more processors to perform the steps of receiving a query template over a data set that resides in the cloud, optimizing the query template to segment the query template into an offline phase and an online phase, executing the offline phase on the cloud to build one or more indexes, and sending the one or more indexes to the desktop.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention for providing a virtual environment spanning a desktop and a cloud is disclosed. Numerous specific details are set forth in order to provide a thorough understanding of the present invention. It will be understood, however, to one skilled in the art, that the present invention may be practiced with other specific details.

Overview

A virtual environment is provided that spans a cloud environment and a desktop environment, that presents a unified abstraction to a user and that automates the conventional tasks of desktop-cloud computing. The underlying technologies needed to achieve this vision of the virtual environment are described below.

"Desktop" is a generic term that generally refers to any user computing device, such as a desktop, a laptop or a palmtop, among other devices. A "cloud" (a.k.a, "grid", "cluster" or other term) is a collection of computing devices that is managed by some software. A device of the present invention is hardware, software or a combination thereof. A device may sometimes be referred to as an apparatus. Each device is configured to carry out one or more steps of the method of providing a virtual environment spanning a desktop and a cloud.

Computerized data analysis occurs at two distinct granularities:

Small and close—a small data set processed on a desktop computer, using a variety of data manipulation and analysis tools, e.g., scripts, spreadsheets, matlab, desktop DBMS (database management system) and associated applications.

Big and far—a large data set processed in a cluster computing environment, with software abstractions to hide the underlying complexity, for example, distributed file system, map-reduce-style processing framework, parallel DBMS. This scenario is sometimes referred to as cloud computing. Some cloud computing environments offer fast but simple key-based lookup services; here the focus is on cloud computing environments that process complex queries in a batch fashion. A query is a request for information from a database.

In the big-and-far scenario, the data feels "far away" in the sense that the user barely has indirect control and visibility into the data and processing occurring in the cluster, and interactions tend to be cumbersome, mysterious and slow. More specifically, the following attractive capabilities are substantially more readily achieved in small-and-close than in big-and-far:

Interactive, data-driven query formulation. Queries and scripts to process the data are formulated incrementally, with pieces being tried on the data one at a time to test the outcome and ensure correctness.

Direct UDF (user-defined function) debugging. UDFs can be debugged over actual data, by simply attaching a debugger to a local process. (In the big-and-far scenario, code is executed on remote machines selected at runtime, and new bugs may emerge that do not occur in local invocations on test data.)

Interactive query response. The user can issue a new query or script and get the answer in real time, as part of an interactive data analysis session.

Overall, small-and-close offers a much more interactive and data-centric experience. Given this fact, combined with the greater availability of tools for the desktop compared to current cloud systems, and the occasional hassles associated with timesharing on the cloud, it is not surprising that users generally opt for small-and-close when the users can get away with it (e.g., the users have small data sets, or their analysis can tolerate sampled data). If forced into the big-and-far scenario due to large data and inapplicability of sampling, users tend to migrate back to small-and-close as soon as the data has been sufficiently reduced by aggregation and filtering to fit on the desktop.

An important goal here is to bring the advantages of small-and-close to the big-and-far world, in other words, to make cloud computing behave as if the cloud computing were small-and-close. This goal is challenging, and indeed some aspects may be unattainable, but it should be possible to do much better than then what have been done in the conventional art. Before fully describing the solution, a concrete motivating scenario is presented.

Example Motivating Scenario

Consider the following substantially large data set maintained by a web search engine company, including the following tables:

---
pages(url, content, contentType, language, isSpam, isDuplicate);
clicks(ipAddress, url, time); and
locations(ipPrefix, country).
---

The pages table may contain one tuple per web page URL (Uniform Resource Locator), with the raw URL content as well as various extracted features: the content type (text, audio, video, etc.); the language used in the content, if known (English, French, etc., or Unknown/Not-Applicable); whether the page has been classified as spam; whether the page has been classified as a duplicate or a near-duplicate of another page. The clicks table contains a series of tuples indicating that a user originating at a particular IP (Internet Protocol) address visited a particular URL at a particular time. The locations table provides a mapping from IP address prefixes to countries.

The data is kept on a large cluster with thousands of nodes (a "cloud"). The software running on the cluster processes ad-hoc queries and scripts submitted by employees of the search engine company.

Suppose a particular employee wishes to explore some characteristics of the web that might influence the design of a future web crawler. The characteristics of interest include the pre-extracted features stored with each URL (e.g., content type, language, spam tag, duplicate tag), as well several features that need to be computed (e.g., number of referring hyperlinks, content of referring anchortext, number of user visits from a given country, etc.). The employee wishes to see which web sites are dominant for a given set of characteristics, and be able to adjust the characteristics interactively and get a rapid response. For example, the employee may start by looking at dominant web sites referred by French-language URLs, and then drill-down into ones that contain the phrase "telechargement gratuite" ("free downloads" in English) in the referring anchortext. The employee may spend several hours exploring the data by applying different filters and seeing which web sites surface.

Figure 1:
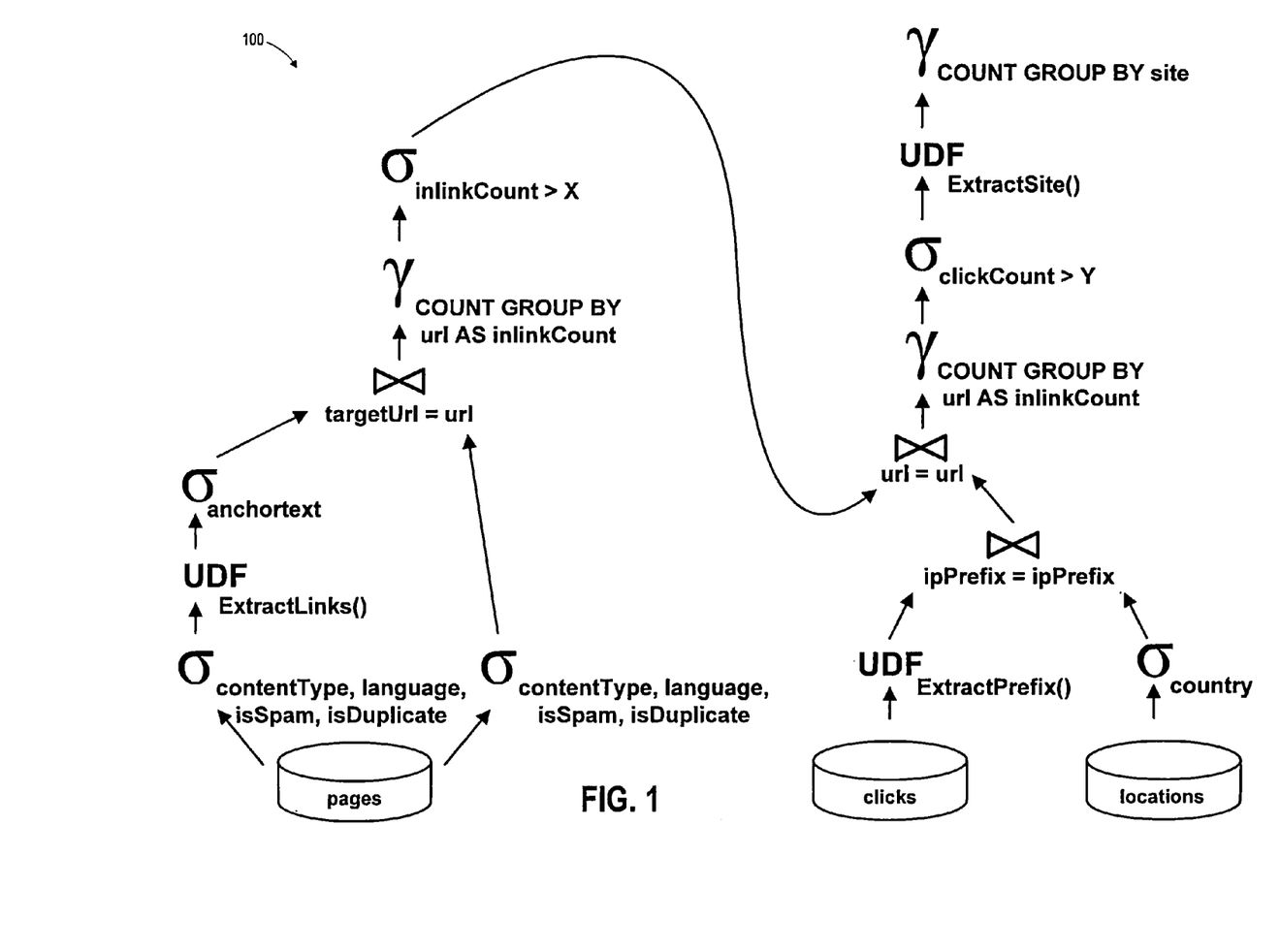
FIG. 1 is an example of a Web exploration query template, in accordance with an embodiment of the present invention.

FIG. 1 is an example of a Web exploration query template 100, in accordance with an embodiment of the present invention. Cylinders denote tables, ⋈ symbols denote joins, symbols denote grouped aggregation, "UDF" symbols denote user-defined functions, and (7 symbols denote filters. Each filter is optional, and is governed by predicates supplied by the user dynamically, as part of the data exploration process. A given set of filter predicates yields a particular instantiation of the query template. There are four types of predicates: Boolean predicates for is Spam and is Duplicate, categorical predicates for contentType, language and country, keyword matching predicates for anchortext (i.e., functions that determine if the anchortext contain a given set of words), and numerical predicates for inlinkCount and clickCount.

The query template of FIG. 1 operates as follows. Starting in the lower-left corner, the system makes two copies of the web pages table, one to represent referring pages and one to represent target pages. Both copies may be filtered according to optional predicates on content type, language, spam tag and duplicate tag. For the referring pages table, a special UDF ExtractLinks( ) is executed that extracts the anchortext and URL of outgoing links. After filtering according to zero or more anchortext keywords, the referring pages table is joined with the target pages table according to the hyperlink reference. Then, the number of pages referring to each page (the inlink count) is determined, and pages may be filtered according to a user-supplied lower bound X on inlink count.

Next, moving to the lower-right corner, the system optionally filters locations by country, and then joins the locations with clicks according to IP prefixes extracted from the click IP addresses. The resulting table is joined with the main web page table. Then, the number of clicks to each page (the click count) is determined, and pages may be filtered according to a user-supplied lower bound Y on click count. Lastly, a UDF ExtractSite( ) is applied to determine the web site associated with each URL (for example, the web site for http://www.yahoo.com/games/checkers is yahoo.com), and a final aggregation step determines the number of URLs per site that have survived all the previous filtering steps. The resulting count is the output inspected by the user, who may be interested in all the results or perhaps just the web sites with the highest counts for the given filter instantiations.

Challenges

In the above scenario, the user may face the following difficulties:

Mistakes in query formulation. The user may mis-formulate the query. For example, the employee might neglect to use outer-join for the two URL-based join operations (in case no filtering on inlink/click count is performed, and URLs with no inlinks/clicks are to be retained). Another possible mistake is to neglect to normalize URLs in clicks (via a UDF that converts URL strings to a canonical form), if they are not stored in pre-normalized format, so that they can be matched properly with URLs in pages.

UDF crashes. A UDF may fail. For example, a naively-implemented ExtractLinks( ) function may consume too much memory upon seeing a very large document in the cloud that was not included in the sample set used for testing on the desktop.

Query segmentation. The user must convert the query template into two segments: a parameter-free segment to be executed offline in the cloud, followed by a parameter-dependent segment to be executed repeatedly on the desktop with different parameter bindings. The user must ensure that the resultant two-segment query is equivalent to the original query, while performing as much work as possible in the offline segment. Perhaps the most challenging aspect is to ensure that the amount of data transferred from the cloud to the desktop is appropriate: not so large that it does not fit or cannot be queried interactively, but not so small that the analysis becomes uninteresting. The user can control the size of data transferred to the desktop for the online segment in two ways: restricting the query template bindings (e.g., fixing the language category to English; restricting the click count threshold Y to be greater than 1000; restricting the anchortext keywords to be ones that match at least 100 pages), or introducing sampling operators (e.g., randomly sample URLs in the right-hand branch of pages). The user may have to try several configurations to converge on a good desktop data size, and the employee must be careful to understand the implications of any sampling introduced.

State management. Queries may go through several iterations, with some processing steps taking a long time (perhaps overnight), thereby necessitating multiple distinct user sessions. Further, a single query template may be used in multiple analysis sessions separated by days or even months. It may be difficult for the user to keep track of the various query fragments and intermediate data tables/files between sessions, especially with data and queries/scripts being shuttled between the cloud and the desktop.

While these issues can arise in any data-centric environment, these issues are exacerbated in the "big and far" cloud computing scenario due to the lack of visibility into data and processing as described above, and the fact that iterative trial-and-error attempts can take a long time.

Solution

What is needed is a tool that facilitates data-driven query formulation, helps diagnose remote UDF failures, and automates the query segmentation process. The tool would take care of executing query components in the two locations and shuttling data back and forth as needed, all transparently to the user. From the user's point of view, rather than distinct desktop and cloud environments, there would be only a single virtual environment spanning both.

Figure 2:
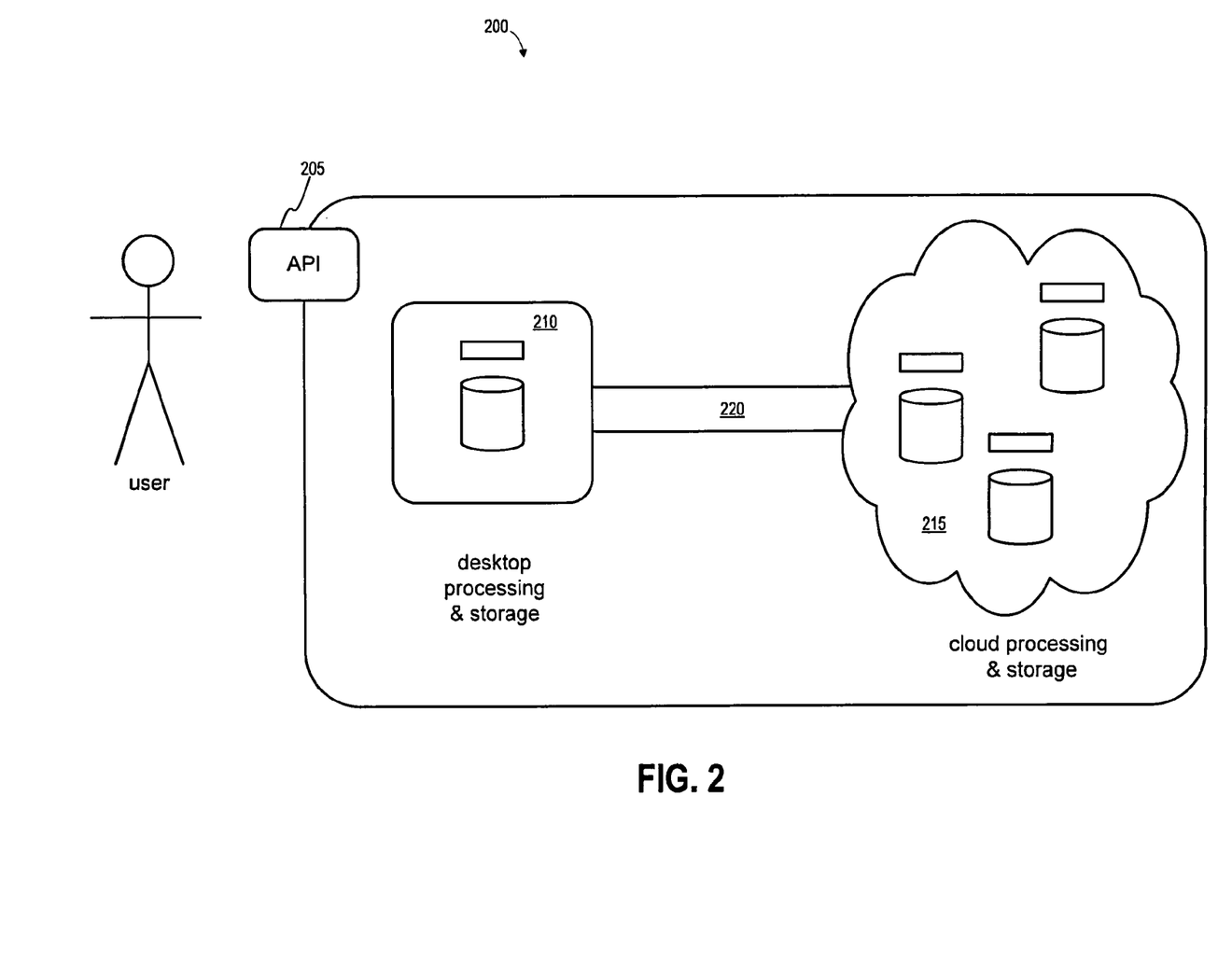
FIG. 2 is a single virtual environment from a user's point of view that spans both a desktop and a cloud, in accordance with an embodiment of the present invention.

FIG. 2 is a single virtual environment 200 from a user's point of view that spans both a desktop and a cloud, in accordance with an embodiment of the present invention. An API (application program interface) 205 is the user's point of view at the desktop environment 210. A network 220 couples the desktop environment 210 to the cloud environment 215. The desktop environment 210 includes desktop processing and storage. The cloud environment 215 includes cloud processing and storage. The network 220 may be any combination of networks, including without limitation the Internet, a local area network, a wide area network, a wireless network and a cellular network.

The envisioned virtual environment 200 exports a single namespace for data and processing elements, regardless of where they reside, and a single API 205 for user interactions. The virtual environment 200 supports long-term user sessions that span periods of disconnected operation while the user waits for the outcome of offline processing steps. The virtual environment also offers versioning of queries and intermediate results to help the user backtrack if the user makes a mistake. (Although versioning of intermediate results is complicated by data updates, many data analysis scenarios deal with read-only data sets or data sets that are themselves versioned [e.g., a monthly web crawl], and updates are not a major concern.)

In the remainder of this description, some of the basic technologies needed to create such a tool are provided. The discussion here focuses on how to take a correctly-formulated, bug-free query template and compile it for a desktop-cloud virtual environment.

Query Segmentation

Query segmentation divides a given query template into a parameter-free offline segment, followed by a parameter-dependent online segment. The requirements, as motivated above in the discussion with reference to FIG. 1, are the following: (1) the data required for the online segment is small enough to fit on a desktop machine; (2) the online segment executes at "interactive speeds" (i.e., a few seconds).

One possible approach is to accept general relational queries and to invoke a physical database design wizard. A physical design wizard takes as input a set of query templates and a space constraint, and selects materialized views and/or indexes such that instances of the query templates execute quickly, on average. This step would be followed by a negotiation phase, whereby the user is asked to accept additional query restrictions and/or sampling, to shrink the data enough to fit on the desktop and be processed interactively. Standard cardinality and cost estimation techniques can form the basis of a negotiation algorithm.

Unfortunately, the general physical design approach may not work well in the present context. With general queries, the user can easily pose a query template for which interactive analysis is not feasible without overly constraining or sampling the data. Besides, the general automated physical design problem is difficult, and solutions tend to be heuristical or only explore a constrained space of design options. Consequently, even if the user's query template does lend itself to a good solution, a general-purpose physical design wizard may not find it.

Figure 3:
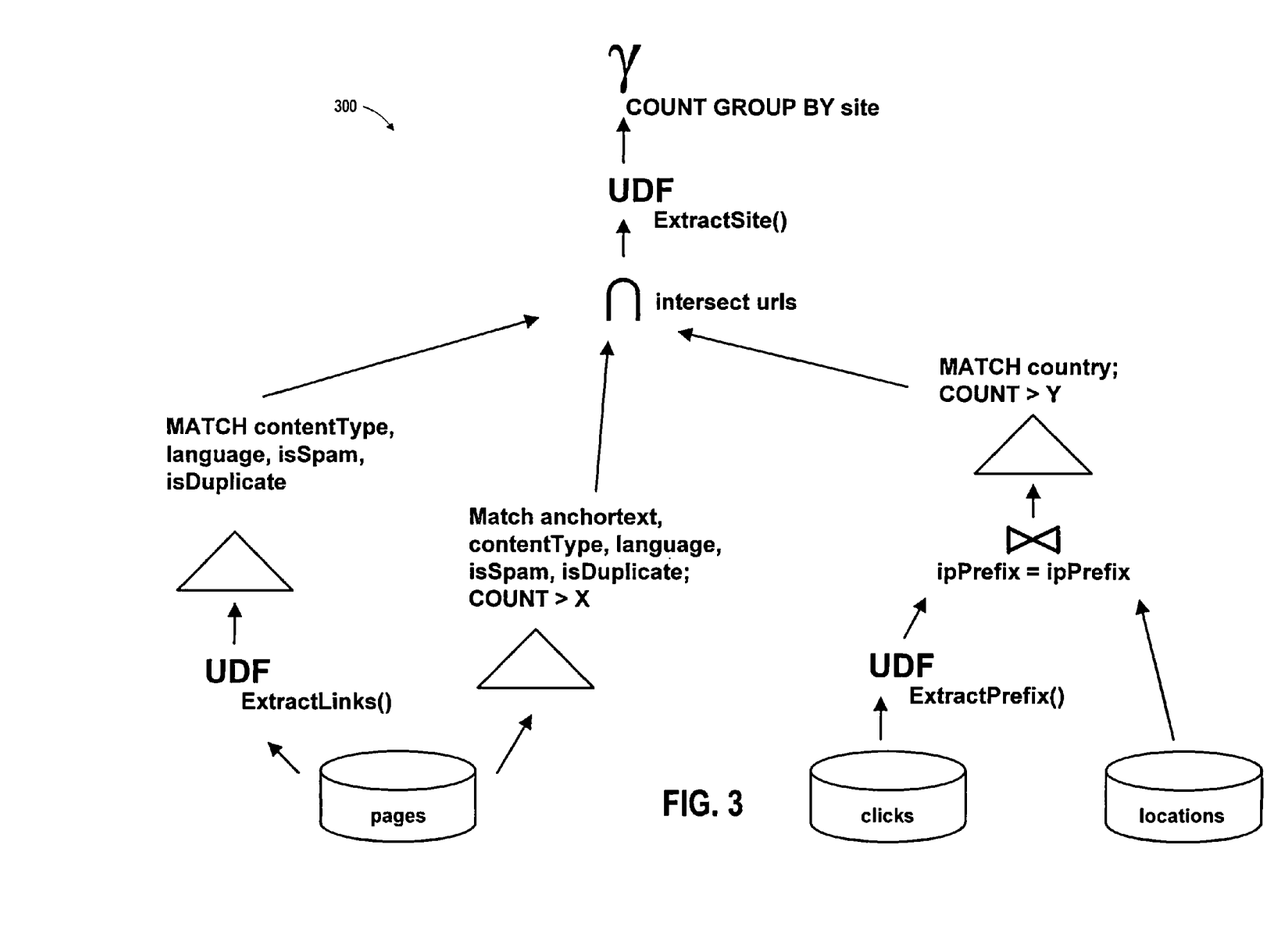
FIG. 3 is an optimized query template of the query template of FIG. 1, optimized for relatively fast online querying in the online phase, in accordance with an embodiment of the present invention.

FIG. 3 is an optimized query template 300 of the query template 100 of FIG. 1, optimized for relatively fast online querying in the online phase, in accordance with an embodiment of the present invention. Triangles denote indexes, which are constructed in the offline segment and probed in the online segment when the user supplies parameter bindings. The index on the left-hand side can be a conventional IR (information retrieval) index or a relational index. The other two indexes shown in FIG. 3 are not as standard: they support lookups of the form "find URLs that received more than Y clicks from country Z." This type of index can be implemented using variations on standard indexing techniques; the details are not discussed here.

In practice the negotiation phase would likely introduce additional filtering and/or sampling operators to the offline component, to keep the indexes small. For example, if the system constrains X>100 and Y>1000, and ignores anchor-text keywords that occur in fewer than 10 links, then the corresponding indexes can be made much smaller. For simplicity, FIG. 3 does not show these restrictions.

Overview of Method

Figure 4:
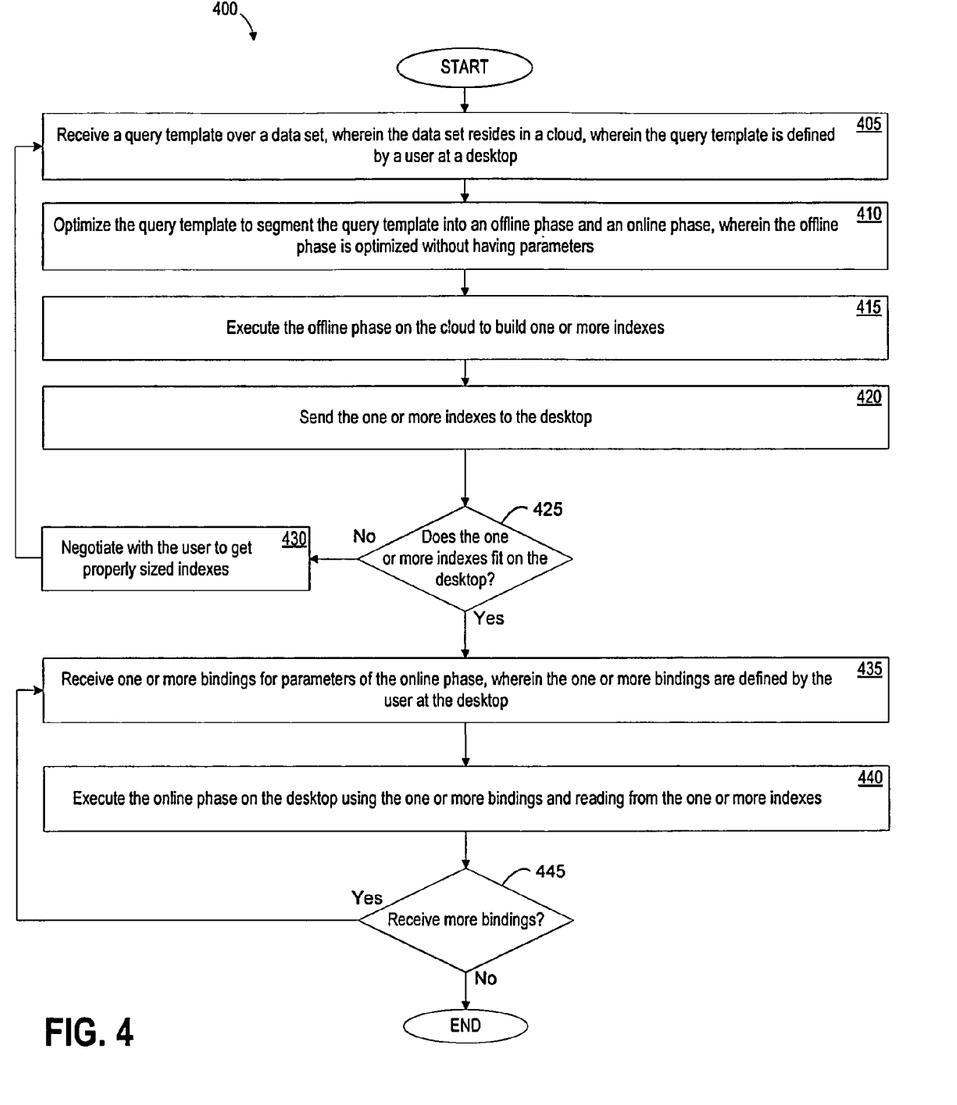
FIG. 4 is a flowchart of a method for providing a virtual environment spanning a desktop and a cloud, in accordance with an embodiment of the present invention.

FIG. 4 is a flowchart of a method 400 for providing a virtual environment spanning a desktop and a cloud, in accordance with an embodiment of the present invention. The steps of the method 400 may be carried out by the virtual environment 200 of FIG. 2. The method 400 starts in step 405 where the system receives a query template over a data set. The data set is substantially large and resides in the cloud. The query template is defined by a user at the desktop. The method 400 then moves to step 410 where the system optimizes the query template to segment the query template into an offline phase and an online phase. The system performs optimization on the offline phase without the use of predefined parameters. Next, in step 415, the system executes the offline phase on the cloud in order to build one or more indexes. The method 400 then moves to step 420 where the system sends the one or more indexes to the desktop.

Next, in decision operation 425, the system determines if the one or more indexes fit in the desktop. The indexes may be too big for the desktop. If the indexes are too big for the desktop, the method 400 moves to step 430 where the system negotiates with the user at the desktop to receive properly sized indexes. The negotiation may be a simple message to the user explaining that the query template needs to be constructed in such a way such that the indexes are properly sized for the desktop. After step 430, the method 400 returns to step 405 and continues.

On the other hand, if the system determines that the indexes are the proper size for the desktop, the method 400 moves to step 435, which marks the beginning of the processing for the online phase. The system receives one or more bindings for parameters of the online phase. These one or more bindings are defined by the user at the desktop. Next, in step 440, the system executes on the desktop the online phase using the one or more bindings and reading from the one or more indexes.

Next, in decision operation 445, the system determines if there are more bindings being received from the desktop. If the system is receiving more bindings from the user, then the method 400 returns to step 435 and continues. However, if the system is not receiving more bindings from the user, then the method 400 is at an end.

Note that the method 400 may include other details that are not discussed in this method overview of FIG. 4. Other details are discussed above with reference to the appropriate figures.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include without limitation device drivers, operating systems, and user applications. Ultimately, such computer readable media further includes software for performing the present invention, as described above.

Included in the programming (software) of the general/specialized computer or microprocessor are software modules for implementing the teachings of the present invention, including without limitation receiving a query template over a data set that resides in the cloud, optimizing the query template to segment the query template into an offline phase and an online phase, executing the offline phase on the cloud to build one or more indexes, and sending the one or more indexes to the desktop, according to processes of the present invention.

Advantages

The virtual environment offers an automation of the query template process to a user. The virtual environment produces two segments of execution plans, an offline phase and an online phase. The two segments have a comprehensive layer of indexes between them. There are requirements for extremely compact data structures (relative to the size of the cloud) and extremely fast execution of the online segment, combined with the importance of incorporating unstructured textual data. Accordingly, a solution for the virtual environment based on IR-style indexes is preferred. IR indexes incorporate sophisticated compression technology and may be optimized for extremely fast intersection of partial result sets. Further details for optimizing the indexes are beyond the scope of the present discussion.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving, at a computing device, a query template comprising a request for web pages from a data set that resides in a cloud comprising a cluster of computing devices, said query template defined by a user associated with a client computer;
   optimizing, via the computing device, the query template to segment the query template into an offline phase and an online phase, the offline phase comprising a query segment with no parameters, the online phase comprising a query segment with parameters;

executing, via the computing device, the offline phase in accordance with the cluster of computing devices of the cloud to build one or more indexes;

executing, via the computing device, the online phase respective to the client computer at an interactive speed, said client computer comprising a space constraint, said online phase execution comprises negotiating with said client computer via sampling the query segment with parameters at said interactive speed, wherein the building of the one or more indexes is based on the space constraint associated with the client computer; and sending, via the computing device, the one or more indexes based on the space constraint to the client computer.

2. The method of claim 1, further comprising:
determining that the one or more indexes are too big to fit in the client computer; and
negotiating with a user to get properly sized indexes.

3. The method of claim 1, further comprising:
determining that the one or more indexes are properly sized to fit in the client computer;
receiving one or more bindings for parameters of the online phase; and
executing the online phase on the client computer using the one or more bindings and reading from the one or more indexes.

4. The method of claim 1, wherein the optimizing, the executing and the sending are automated steps that facilitate a query template segmentation process and that are transparent to a user.

5. The method of claim 1, further comprising:
supporting long-term user sessions that span periods of disconnected operation while the user waits for the outcome of offline processing steps.

6. The method of claim 1, further comprising:
expressing the query template in SQL; and
performing all expensive and data-expanding operations in the offline phase.

7. The method of claim 1, wherein the one or more indexes are at least one of a conventional information retrieval index, a relational index, and a non-standard index.

8. A non-transitory computer-readable storage medium tangibly encoded with computer executable instructions, that when executed by a processor associated with a computing device, performs a method comprising:
receiving a query template comprising a request for web pages from a data set that resides in a cloud comprising a cluster of computing devices, said query template defined by a user associated with a client computer;
optimizing the query template to segment the query template into an offline phase and an online phase, the offline phase comprising a query segment with no parameters, the online phase comprising a query segment with parameters;
executing the offline phase in accordance with the cluster of computing devices of the cloud to build one or more indexes;
executing the online phase respective to the client computer at an interactive speed, said client computer comprising a space constraint, said online phase execution comprises negotiating with said client computer via sampling the query segment with parameters at said interactive speed, wherein the building of the one or more indexes is based on the space constraint associated with the client computer; and
sending the one or more indexes based on the space constraint to the client computer.

9. The non-transitory computer-readable storage medium of claim 8, further comprising:
determining that the one or more indexes are too big to fit in the client computer; and
negotiating with a user to get properly sized indexes.

10. The non-transitory computer-readable storage medium of claim 8, further comprising:
determining that the one or more indexes are properly sized to fit in the client computer;
receiving one or more bindings for parameters of the online phase; and
executing the online phase on the client computer using the one or more bindings and reading from the one or more indexes.

11. The non-transitory computer-readable storage medium of claim 8, wherein the optimizing, the executing and the sending are automated steps that facilitate a query template segmentation process and that are transparent to a user.

12. The non-transitory computer-readable storage medium of claim 8, further comprising:
supporting long-term user sessions that span periods of disconnected operation while the user waits for the outcome of offline processing steps.

13. The non-transitory computer-readable storage medium of claim 8, further comprising:
expressing the query template in SQL; and
performing all expensive and data-expanding operations in the offline phase.

14. The non-transitory computer-readable storage medium of claim 8, wherein the one or more indexes are at least one of a conventional information retrieval index, a relational index, and a non-standard index.

15. A system comprising:
at least one computing device comprising:
memory storing computer-executable instructions; and
one or more processors for executing said computer-executable instructions, comprising:
receiving a query template comprising a request for web pages from a data set that resides in a cloud comprising a cluster of computing devices, said query template defined by a user associated with a client computer;
optimizing the query template to segment the query template into an offline phase and an online phase, the offline phase comprising a query segment with no parameters, the online phase comprising a query segment with parameters;
executing the offline phase in accordance with the cluster of computing devices of the cloud to build one or more indexes;
executing the online phase respective to the client computer at an interactive speed, said client computer comprising a space constraint, said online phase execution comprises negotiating with said client computer via sampling the query segment with parameters at said interactive speed, wherein the building of the one or more indexes is based on the space constraint associated with the client computer; and
sending the one or more indexes based on the space constraint to the client computer.

16. The system of claim 15, further comprising:
determining that the one or more indexes are too big to fit in the client computer; and
negotiating with a user to get properly sized indexes.

17. The system of claim 15, further comprising:
- determining that the one or more indexes are properly sized to fit in the client computer;
- receiving one or more bindings for parameters of the online phase; and
- executing the online phase on the client computer using the one or more bindings and reading from the one or more indexes.

18. The system of claim 15, wherein the optimizing, the executing and the sending are automated steps that facilitate a query template segmentation process and that are transparent to a user.

19. The system of claim 15, further comprising:
- supporting long-term user sessions that span periods of disconnected operation while the user waits for the outcome of offline processing steps.

20. The system of claim 15, further comprising:
- expressing the query template in SQL; and
- performing all expensive and data-expanding operations in the offline phase.

\* \* \* \* \*